United States Patent
Jang

(10) Patent No.: US 12,176,164 B2
(45) Date of Patent: Dec. 24, 2024

(54) PLUG INTERLOCK APPARATUS FOR VACUUM CIRCUIT BREAKER

(71) Applicant: LS ELECTRIC CO., LTD., Anyang-si (KR)

(72) Inventor: Min-Ho Jang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 149 days.

(21) Appl. No.: 17/797,226

(22) PCT Filed: Jan. 27, 2021

(86) PCT No.: PCT/KR2021/001109
§ 371 (c)(1),
(2) Date: Aug. 3, 2022

(87) PCT Pub. No.: WO2021/157947
PCT Pub. Date: Aug. 12, 2021

(65) Prior Publication Data
US 2023/0065103 A1    Mar. 2, 2023

(30) Foreign Application Priority Data
Feb. 3, 2020    (KR) .......................... 10-2020-0012466

(51) Int. Cl.
*H01H 9/20*    (2006.01)
*H01H 33/46*    (2006.01)
*H01H 33/666*    (2006.01)

(52) U.S. Cl.
CPC ............ *H01H 33/666* (2013.01); *H01H 9/20* (2013.01); *H01H 33/46* (2013.01)

(58) Field of Classification Search
CPC .. H01H 33/666; H01H 33/46; H01H 33/6606; H01H 9/20; H01H 71/522; H01H 2239/032; H02B 11/133; H02B 11/127
(Continued)

(56) References Cited

U.S. PATENT DOCUMENTS 4,486,814 A * 12/1984 Ishikawa .............. H02B 11/127
                                                          361/609
8,395,064 B2 * 3/2013 Kim ...................... H02B 11/133
                                                          200/50.21
(Continued)

FOREIGN PATENT DOCUMENTS

JP    H0822750 A    1/1996
KR    19990034272 U    8/1999
(Continued)

OTHER PUBLICATIONS

Translation of KR19990034272 (Original document published Aug. 25, 1999) (Year: 1999).*
(Continued)

*Primary Examiner* — William A Bolton
(74) *Attorney, Agent, or Firm* — K&L Gates LLP

(57) ABSTRACT

A plug interlock apparatus for a vacuum circuit breaker, comprising: a control power plug having a plug fixing member formed on each side thereof; a switchboard including a plurality of terminals; a control power connector from which the control power plug is detached; a plug latch formed on the sides of the control power connector and fixing the plug fixing members; a circuit breaker body which includes a connector rotation link which rotates in association with the plug latch, and a slide link having one end coupled to the connector rotation link, and which is detached from the terminal and supplied with voltage and current; and a transfer cart for reciprocating the circuit breaker body along a rail installed on the bottom surface of the switchboard, wherein a locking latch detached from a rail groove formed on the rail is formed at the other end of the slide link.

4 Claims, 13 Drawing Sheets

(58) Field of Classification Search
USPC ............... 218/153, 154, 120; 200/50.21
See application file for complete search history.

(56) References Cited

U.S. PATENT DOCUMENTS

| | | | | |
|---|---|---|---|---|
| 8,575,502 | B2* | 11/2013 | Yang | H02B 11/133 |
| | | | | 200/50.21 |
| 9,425,590 | B2* | 8/2016 | Jo | H02B 11/133 |
| 9,490,612 | B2* | 11/2016 | Hanna | H02B 11/167 |
| 9,779,891 | B1* | 10/2017 | Ashtekar | H02B 11/133 |
| 10,090,120 | B2 | 10/2018 | Seo | |
| 2011/0155545 | A1 | 6/2011 | Yang et al. | |
| 2018/0122593 | A1 | 5/2018 | Seo | |

FOREIGN PATENT DOCUMENTS

| | | | |
|---|---|---|---|
| KR | 20100081174 | A | 7/2010 |
| KR | 20110079231 | A | 7/2011 |
| KR | 20170002473 | U | 7/2017 |
| KR | 20180005798 | A | 1/2018 |
| KR | 101839090 | B1 | 4/2018 |

OTHER PUBLICATIONS

Translation of KR20180005798 (original document published Jan. 17, 2018) (Year: 2018).*
Notice of Allowance for related Japanese Application No. 2022-547185; action dated Aug. 8, 2023; (5 pages).
International Search Report for related International Application No. PCT/KR2021/001109; action dated Aug. 12, 2021; (5 pages).
Written Opinion for related International Application No. PCT/KR2021/001109; action dated Aug. 12, 2021; (7 pages).

* cited by examiner

PLUG INTERLOCK APPARATUS FOR VACUUM CIRCUIT BREAKER

CROSS-REFERENCE TO RELATED APPLICATIONS

This application is the National Stage filing under 35 U.S.C. 371 of International Application No. PCT/KR2021/001109, filed on Jan. 27, 2021, which claims the benefit of earlier filing date and right of priority to Korean Application No. 10-2020-0012466, filed on Feb. 3, 2020, the contents of which are all hereby incorporated by reference herein in their entirety.

FIELD

The present disclosure relates to a plug interlock apparatus for a vacuum circuit breaker.

BACKGROUND

A vacuum circuit breaker is installed in a power plant and a substation and breaks a circuit against abnormal conditions such as overcurrent, short circuit, and ground fault accidents of high voltage distribution lines to protect people and load equipment therefrom.

FIG. 1 is a perspective view showing a conventional vacuum circuit breaker.

Referring to FIG. 1, the conventional vacuum circuit breaker includes a switchboard 100 equipped with a control power plug 110 and a plurality of terminals 120 for supplying voltage and current, a circuit breaker body 200 having a control power connector 210 detachable from and attached to the control power plug 110, and coupled to the terminal 120 to receive the voltage and the current, and a movable carriage 300 for moving the circuit breaker body 200.

In such a conventional vacuum circuit breaker, the circuit breaker body 200 moves to be coupled to the terminal 120 and then receives the voltage and current from the terminal 120. In this state, the control power plug 110 and the control power connector 210 may be removed from each other. Thus, an operation of the vacuum circuit breaker is not performed properly, resulting in an accident or damage to a load device.

In order to solve this problem, Korean Patent Application Publication No. 10-2011-0079231 (Publication Date 2011.07.07) discloses a plug interlock apparatus. The circuit breaker body 200 moves to be coupled to the terminal 120, and then the coupling to the terminal 120 is completed so that the voltage and current from the terminal are supplied thereto. In this state, the plug interlock apparatus prevents the control power plug 110 and the control power connector 210 from being removed from each other.

FIGS. 2 to 4 are perspective views showing a neutral position, a test position, and an operation position of the conventional plug interlock apparatus for the vacuum circuit breaker, respectively.

In this regard, the neutral position means a state in which the control power plug 110 and the control power connector 210 are removed from each other, and the movable carriage 300 is in a fixed state in which the circuit breaker body 200 is spaced apart from the terminal 120.

Further, the test position refers to a state in which the control power plug 110 and the control power connector 210 are coupled to each other, and the movable carriage 300 is in a fixed state in which the circuit breaker body 200 is spaced apart from the terminal 120.

Further, the operation position refers to a state in which the control power plug 110 and the control power connector 210 are coupled to each other, and the movable carriage 300 is in a displaced state in which the circuit breaker body 200 is coupled to the terminal 120 and receives current and voltage therefrom.

Referring to FIG. 2 to FIG. 4, the control power plug 110 includes pins 111 respectively formed on both opposing sides thereof.

Further, each pin groove 211 into which each pin 111 is inserted and each hook 212 for opening and closing a top of each pin groove 211 are formed on each of both opposing sides of the control power connector 210.

In this regard, the hook 212 pivots about a hook hinge 214, and a pivot movement range is limited due to an arc shape of a hook guide hole 213.

Further, one end of a link 400 is coupled to a bottom of the hook 212. When the hook 212 closes the top of the pin groove 211, the link 400 moves downward.

Further, a stopper 410 is coupled to the other end of the link 400. The stopper 410 pivots around a stopper hinge 41a so as to be inserted into and removed from a stopper groove 310 formed in a rail of the movable carriage 300.

Accordingly, when the conventional plug interlock apparatus for the vacuum circuit breaker is at the neutral position, as shown in FIG. 2, the pin 111 is spaced apart from the pin groove 211, and the stopper 410 is inserted into the stopper groove 310 to prevent movement of the movable carriage 300.

When the conventional plug interlock apparatus for the vacuum circuit breaker is at the test position such that the control power plug 110 and the control power connector 210 are coupled to each other as shown in FIG. 3, the pin 111 is inserted into the pin groove 211, and the top of the pin groove 211 is closed with the hook 212 to prevent the control power plug 110 from being removed from the control power connector 210.

Further, as the link 400 moves downward, the stopper 410 is removed from the stopper groove 310 such that the movable carriage 300 is changed to a movable state.

Further, when the conventional plug interlock apparatus for the vacuum circuit breaker is at the operation position such that the control power plug 110 and the control power connector 210 are coupled to each other as shown in FIG. 4, the pin 111 is inserted into the pin groove 211, and the top of the pin groove 211 is closed with the hook 212, thereby preventing the control power plug 110 and the control power connector 210 from being removed from each other.

Further, as the link 400 moves downward, the stopper 410 is removed from the stopper groove 310, such that the movable carriage 300 moves so that the terminal 120 and the circuit breaker body 200 are coupled to each other.

However, in the conventional plug interlock apparatus for the vacuum circuit breaker, as the link 400 is coupled to one side of the control power connector 210 and moves upward or downward, the control power connector 210 may be tilted to one side such that frequent incomplete coupling between the control power plug 110 and the control power connector 210 may occur.

Further, in the conventional plug interlock apparatus for the vacuum circuit breaker, the stopper 410 may not be removed from the stopper groove 310 due to an assembly tolerance of the link 400, the hook 212, and the stopper 410, such that the movement of the movable carriage is impossible or the link 400 itself is damaged.

SUMMARY

The present disclosure has been proposed to solve the above-mentioned problems. Thus, a purpose of the present disclosure is to provide a plug interlock apparatus for a vacuum circuit breaker in which when the circuit breaker body moves from the test position to the operation position or during the operation thereof, the plug interlock apparatus may maintain the firm coupling between the control power plug and the control power connector.

Further, a purpose of the present disclosure is to provide a plug interlock apparatus for a vacuum circuit breaker that may minimize damage and malfunction of each part due to external force or assembly tolerance of each part.

Purposes according to the present disclosure are not limited to the above-mentioned purpose. Other purposes and advantages according to the present disclosure that are not mentioned may be understood based on following descriptions, and may be more clearly understood based on embodiments according to the present disclosure.

Further, it will be easily understood that the purposes and advantages according to the present disclosure may be realized using means shown in the claims and combinations thereof.

A plug interlock apparatus according to the present disclosure includes a switchboard including a control power plug having a plug fixing member and a plurality of terminals; a circuit breaker body including: a control power connector from and to which the control power plug is detached and attached; a plug latch formed on each side of the control power connector so as to fix the plug fixing member; a connector pivot link configured to pivot in conjunction with the plug latch; and a slide link having one end coupled to the connector pivot link, wherein the circuit breaker body is coupled to the terminal and receive voltage and current therefrom; and a movable carriage configured to move along a rail installed on a bottom face of the switchboard so as to reciprocate the circuit breaker body thereon.

Further, a locking latch may be installed at the other end of the slide link, wherein the locking latch may be inserted into or removed from a rail groove defined in the rail.

Further, the slide link may move downward or upward according to the pivot movement of the connector pivot link.

Further, a locking magnet may be installed on one side of the slide link so as to limit the upward movement of the slide link.

Further, a connector pivot link stopper may be in contact with an arc portion of the plug latch so as to limit the pivot movement of the connector pivot link.

Further, when the arc portion is spaced apart from the connector pivot link stopper, a pivot movement of the plug latch can be performed.

According to the present disclosure, when the circuit breaker body of the plug interlock apparatus for the vacuum circuit breaker moves from the test position to the operation position or during the operation thereof, the firm coupling between the control power plug and the control power connector may be maintained by the plug interlock apparatus, thereby preventing safety accidents in advance.

Further, according to the present disclosure, the plug interlock apparatus may minimize damage and malfunction of each part due to an external force or an assembly tolerance of each part, thereby improving reliability of the plug interlock apparatus for the vacuum circuit breaker.

In addition to the above-described effects, the specific effects of the present disclosure will be described together while describing specific details for carrying out the disclosure below.

DETAILED DESCRIPTIONS

Figure 1:
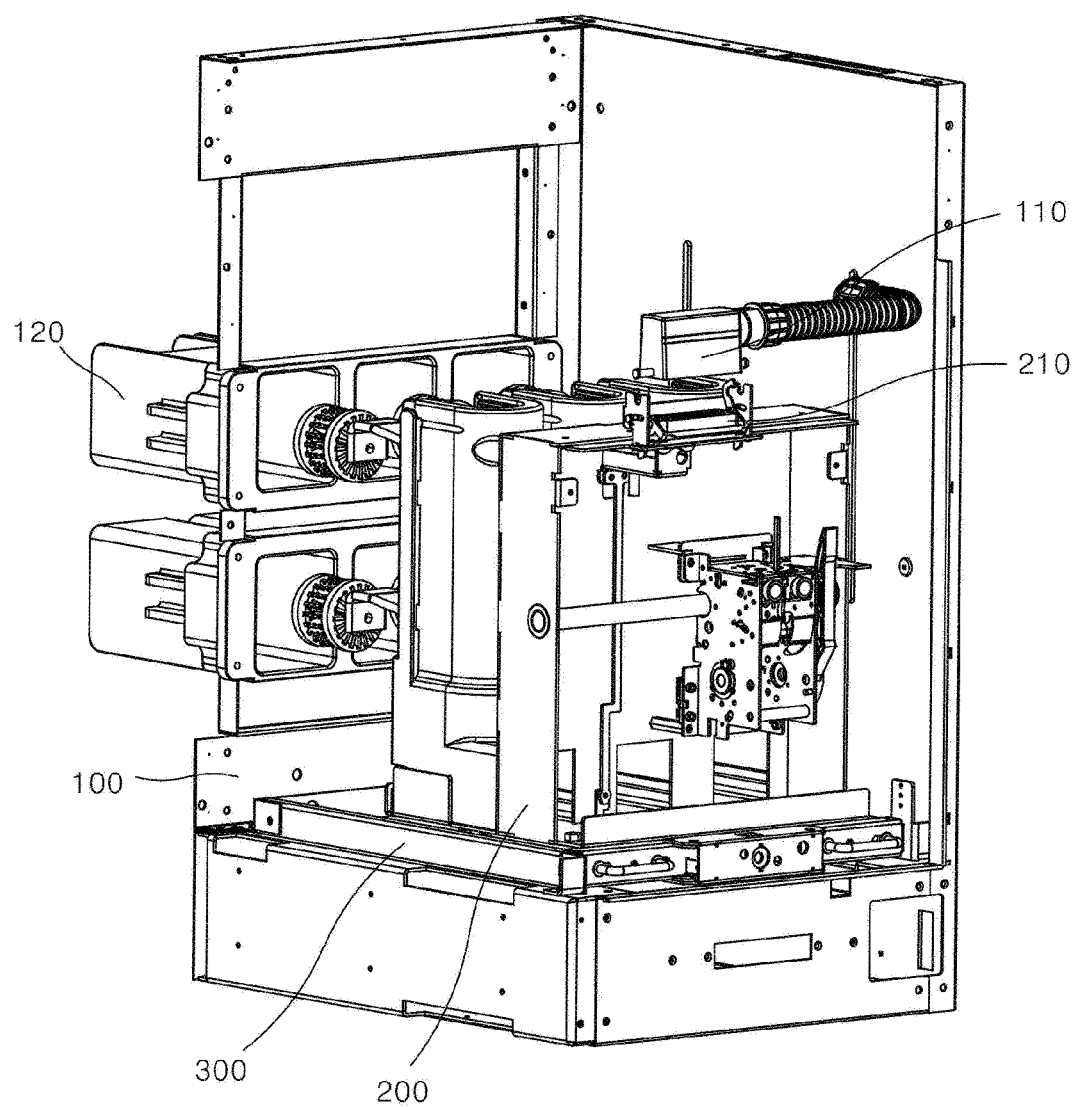
FIG. 1 is a perspective view showing a circuit breaker including the conventional plug interlock apparatus for the vacuum circuit breaker.
Figure 2:
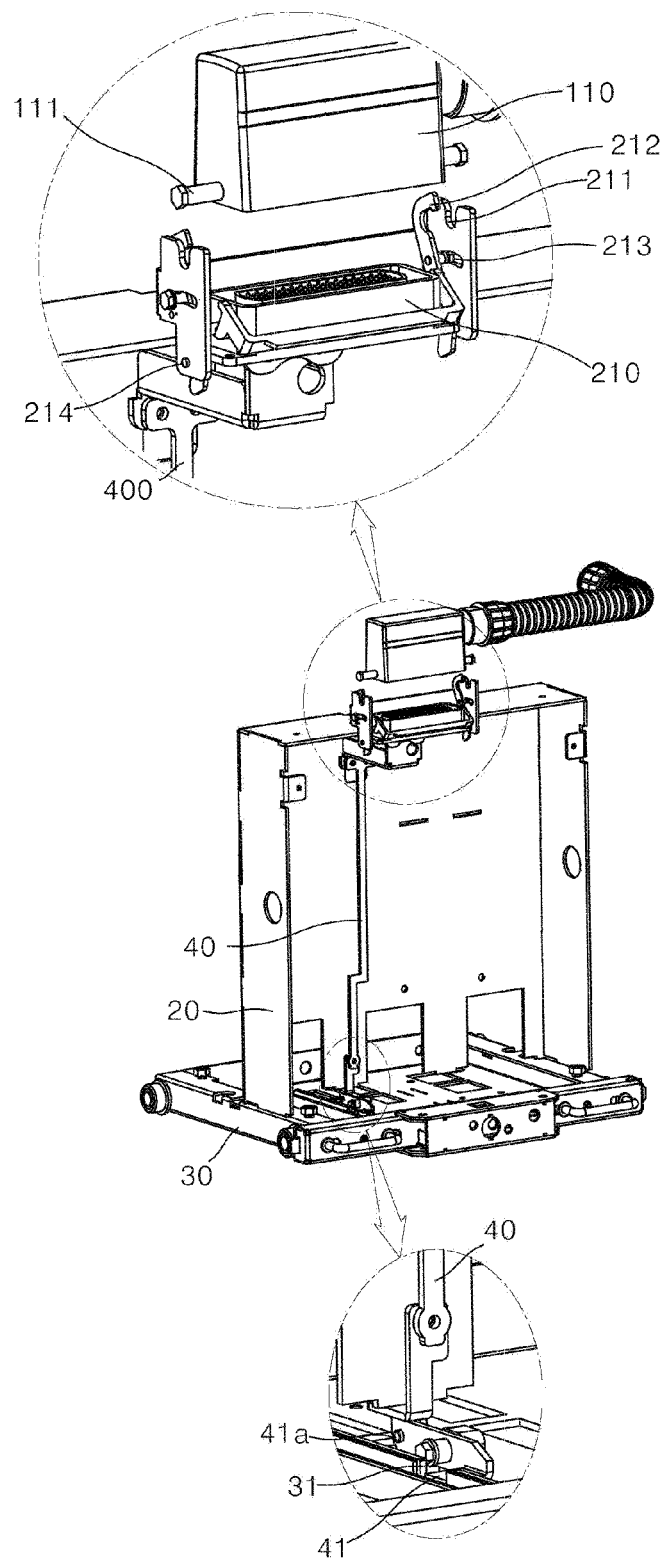
FIG. 2 is a perspective view showing the neutral position of the conventional plug interlock apparatus for the vacuum circuit breaker.
Figure 3:
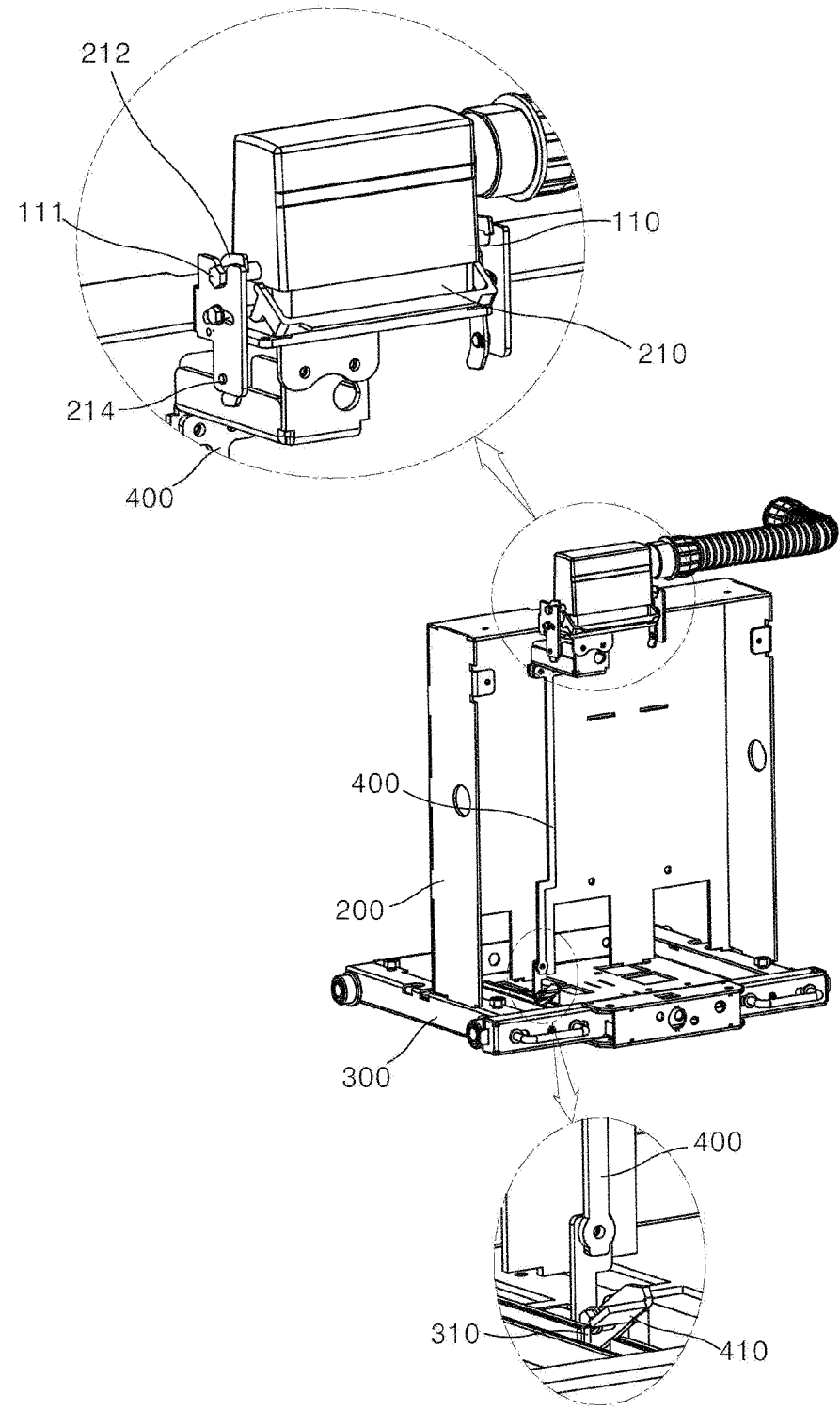
FIG. 3 is a perspective view showing the test position of the conventional plug interlock apparatus for the vacuum circuit breaker.
Figure 4:
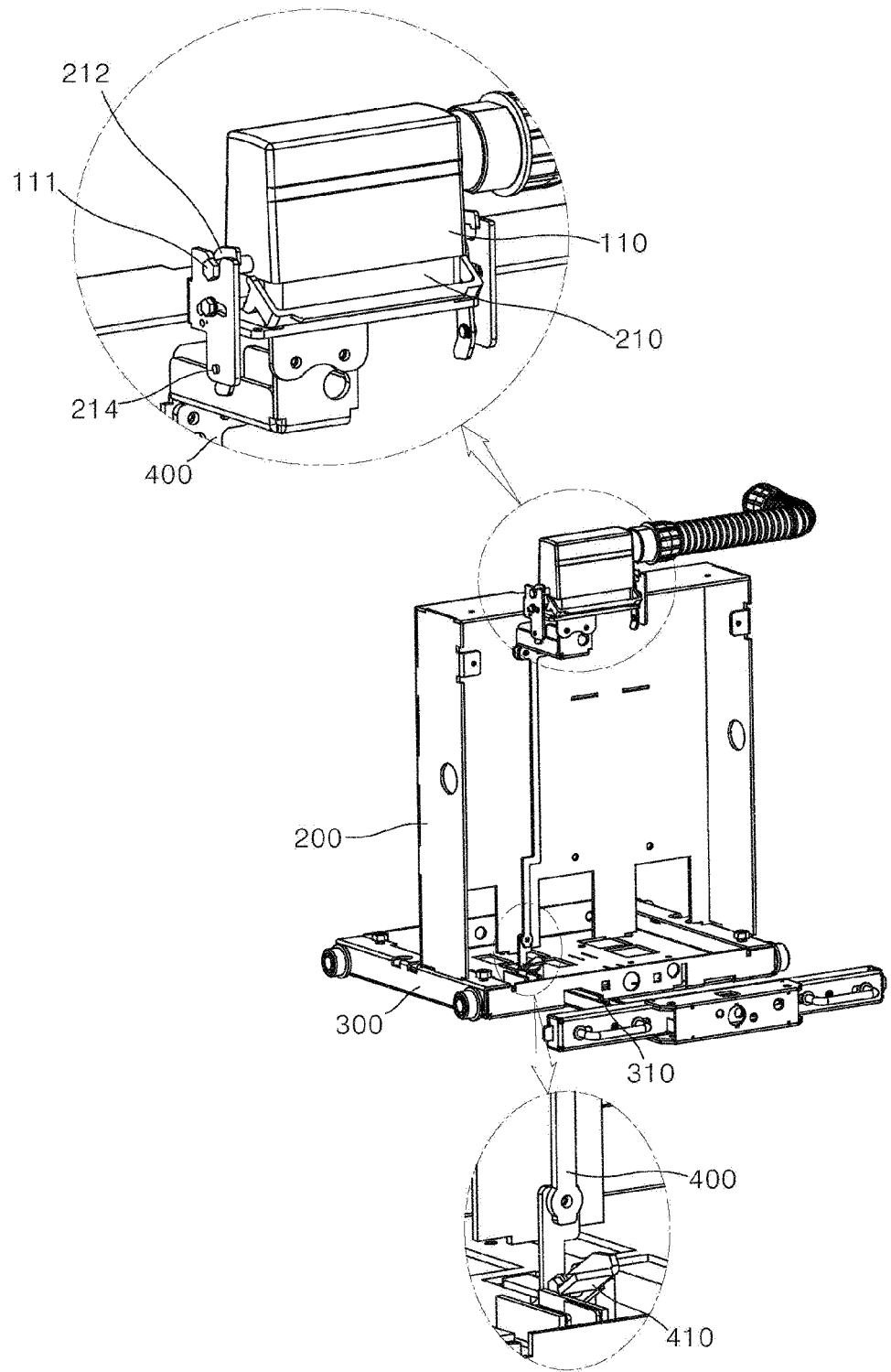
FIG. 4 is a perspective view showing the operation position of the conventional plug interlock apparatus for the vacuum circuit breaker.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

As used herein, the term "A and/or B" includes any and all combinations of one or more of A and B unless otherwise specified. When referring to "C to D", this means C inclusive to D inclusive unless otherwise specified.

Hereinafter, a plug interlock apparatus for a vacuum circuit breaker according to some embodiments of the present disclosure will be described.

Figure 5:
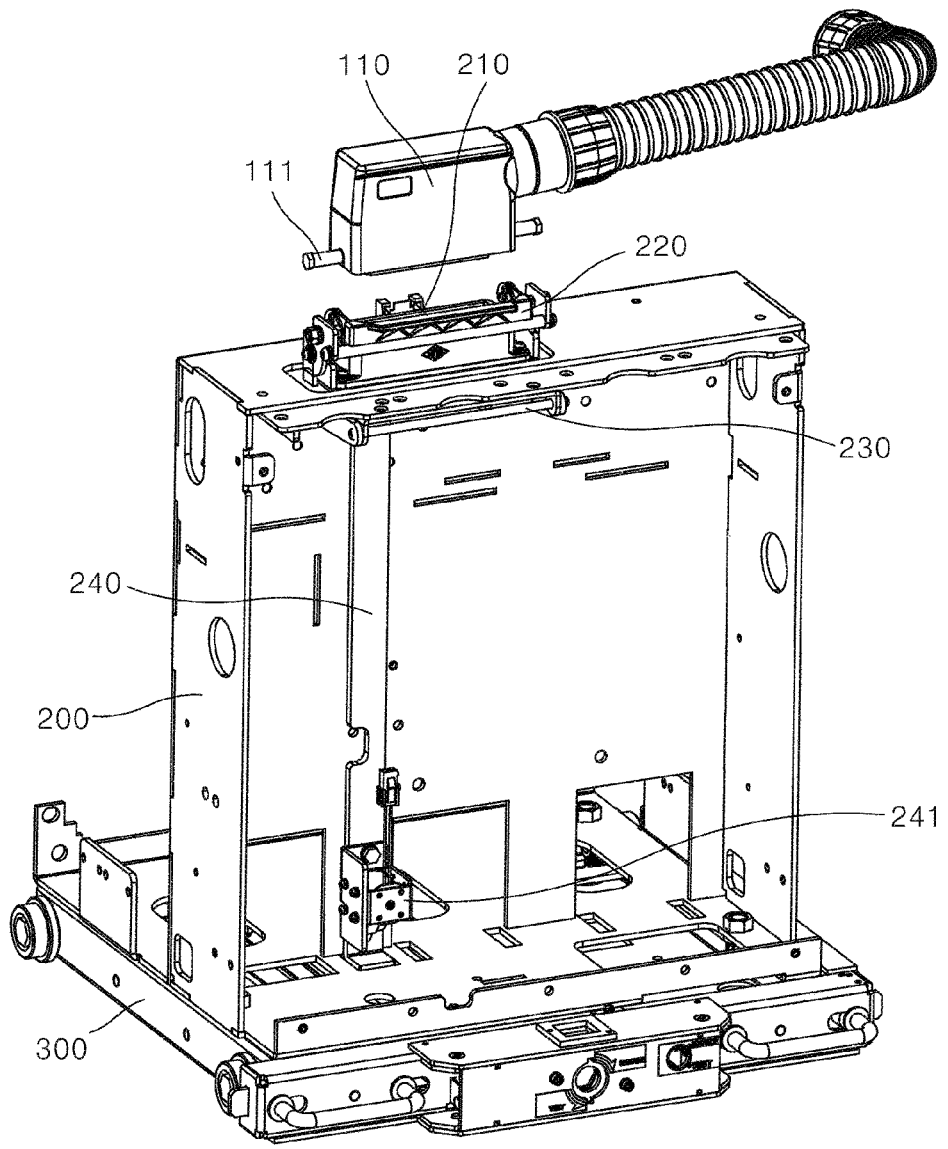
FIG. 5 is a perspective view showing a neutral position of a plug interlock apparatus for a vacuum circuit breaker according to an embodiment of the present disclosure.

FIG. 5 is a perspective view showing a neutral position of a plug interlock apparatus for a vacuum circuit breaker according to an embodiment of the present disclosure.

Figure 6:
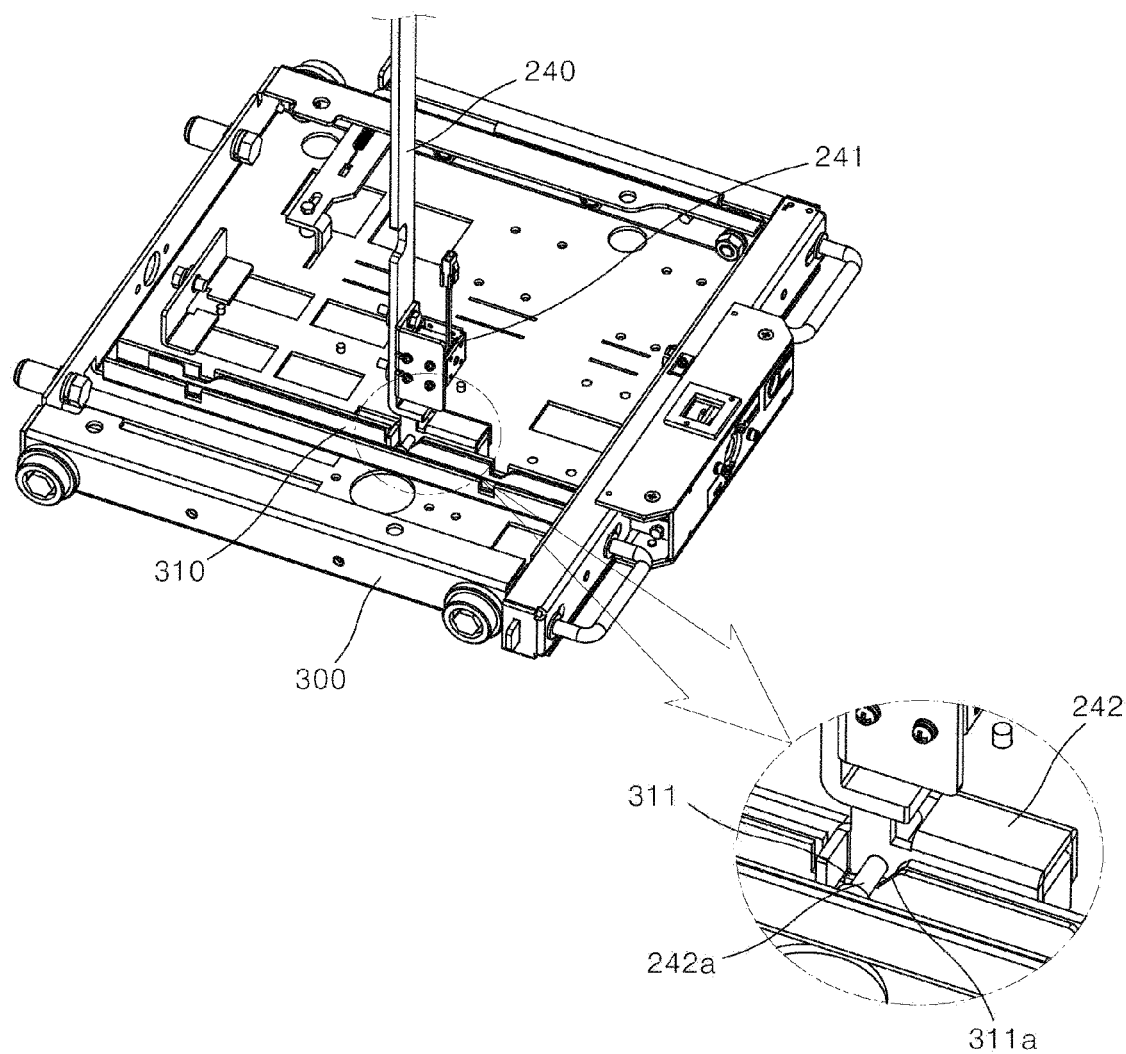
FIG. 6 is a perspective view showing a neutral position of a main component in the plug interlock apparatus for the vacuum circuit breaker according to an embodiment of the present disclosure.
Figure 7:
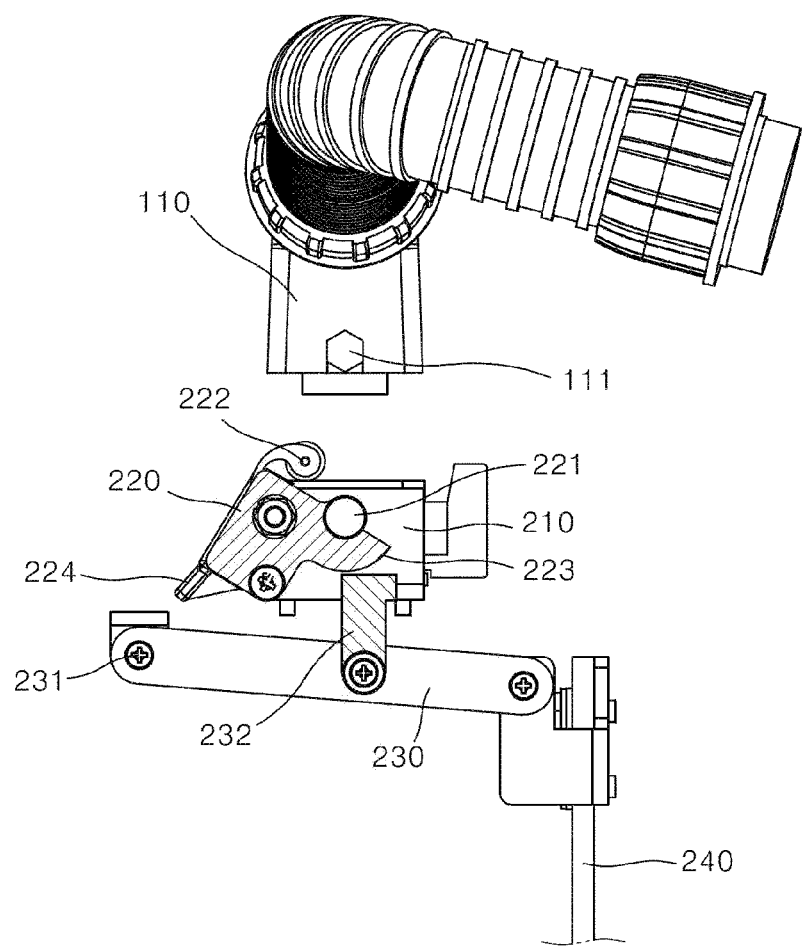
FIG. 7 is a side view showing the neutral position of the main component in the plug interlock apparatus for the vacuum circuit breaker according to an embodiment of the present disclosure.

Further, FIG. 6 and FIG. 7 are respectively a perspective view and a side view showing a neutral position of a main component in a plug interlock apparatus for a vacuum circuit breaker according to an embodiment of the present disclosure.

The same reference numbers are assigned to the same components of the vacuum circuit breaker including the conventional plug interlock apparatus for the vacuum circuit breaker and the vacuum circuit breaker including the plug interlock apparatus according to an embodiment of the present disclosure.

Referring to FIG. 1 and FIG. 5 to FIG. 7, a plug interlock apparatus for a vacuum circuit breaker according to the present disclosure includes the switchboard 100, the circuit breaker body 200 and the movable carriage 300.

The switchboard 100 includes the control power plug 110 formed at one side thereof and the plurality of terminals 120 formed at a rear side thereof.

Further, the circuit breaker body 200 may include the control power connector 210 to and from which the control power plug 110 is attachable and detachable. Thus, the body 200 may be coupled to the terminal 120 and receive voltage and current therefrom.

Further, the circuit breaker body 200 is coupled to the movable carriage 300. As the movable carriage 300 moves along a rail 310 installed on a bottom face of the switchboard 100, the circuit breaker body 200 may be coupled to and removed from the terminal 120.

In one example, the control power plug 110 includes plug fixing members 111 formed on both opposing sides thereof, respectively.

Further, the circuit breaker body 200 includes a plug latch 220 formed on each side of the control power connector 210 and pivoting about a plug latch hinge 221. The plug latch 220 has a plug fixing member hook 222 contacting a top of each of the plug fixing members to prevent the control power plug 110 from being removed from the control power connector 210.

The plug latch 220 may include an arc portion 223 formed under the plug fixing member hook 222 and a plug latch handle 224 for facilitating the pivoting motion of the plug latch 220.

Further, the circuit breaker body 200 may further include a connector pivot link 230 having one end coupled to a connector pivot link hinge 231 installed below the plug latch 220 and the other end coupled to a slide link 240. Thus, the connector pivot link 230 may pivot about the connector pivot link hinge 231.

Further, the connector pivot link 230 has a connector pivot link stopper 232 installed to be in contact with or adjacent to the arc portion 223. The pivot movement of the connector pivot link 230 may be restricted by the connector pivot link stopper 232.

In one example, as described above, the slide link 240 has one end fastened to the connector pivot link 230 and the other end fastened to a locking latch 242 including a locking pin 242a.

Further, the rail 310 includes a rail groove 311 defined therein which the locking pin 242a may be inserted into or separated from.

With reference to FIG. 1 and FIG. 5 to FIG. 7, the neutral position of the plug interlock apparatus for the vacuum circuit breaker according to the present disclosure at which the control power plug 110 and the control power connector 210 are separated from each other and the movable carriage 300 is in a state such that the circuit breaker body 200 is spaced apart from the terminal 120 is described.

The plug fixing member hook 222 is opened so that the control power plug 110 can be coupled to the control power connector 210.

That is, as shown in FIG. 7, the plug latch 220 is positioned such that when the plug fixing member 111 moves downward, the plug fixing member hook 222 does not interfere with the plug fixing member 111.

Further, as the connector pivot link stopper 232 comes into contact with the arc portion 223 to limit the pivot movement of the connector pivot link 230, the slide link 240 is fixed.

Accordingly, as shown in FIG. 6, the locking pin 242a is inserted into the rail groove 311 to limit the movement of the movable carriage 300.

Figure 8:
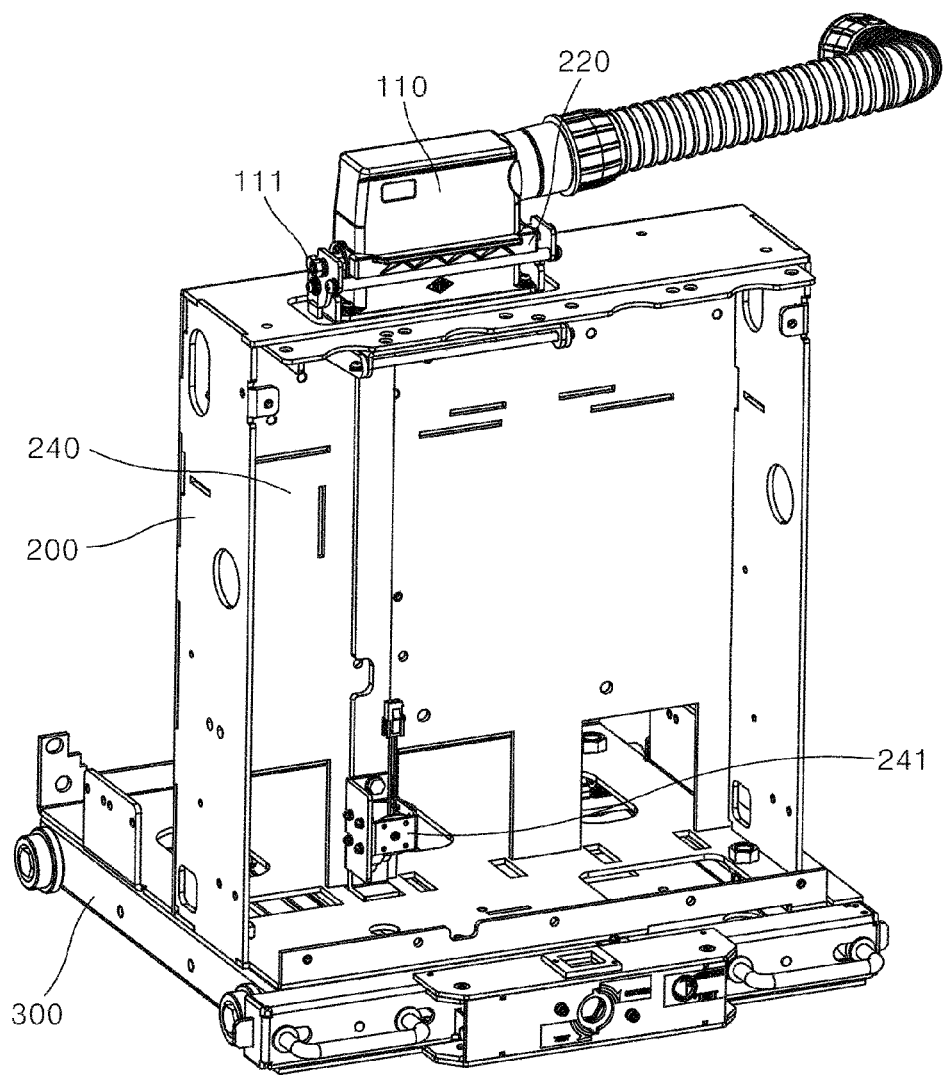
FIG. 8 is a perspective view showing a test position of the plug interlock apparatus for the vacuum circuit breaker according to an embodiment of the present disclosure.

In one example, FIG. 8 is a perspective view showing a test position of a plug interlock apparatus for a vacuum circuit breaker according to an embodiment of the present disclosure.

Figure 9:
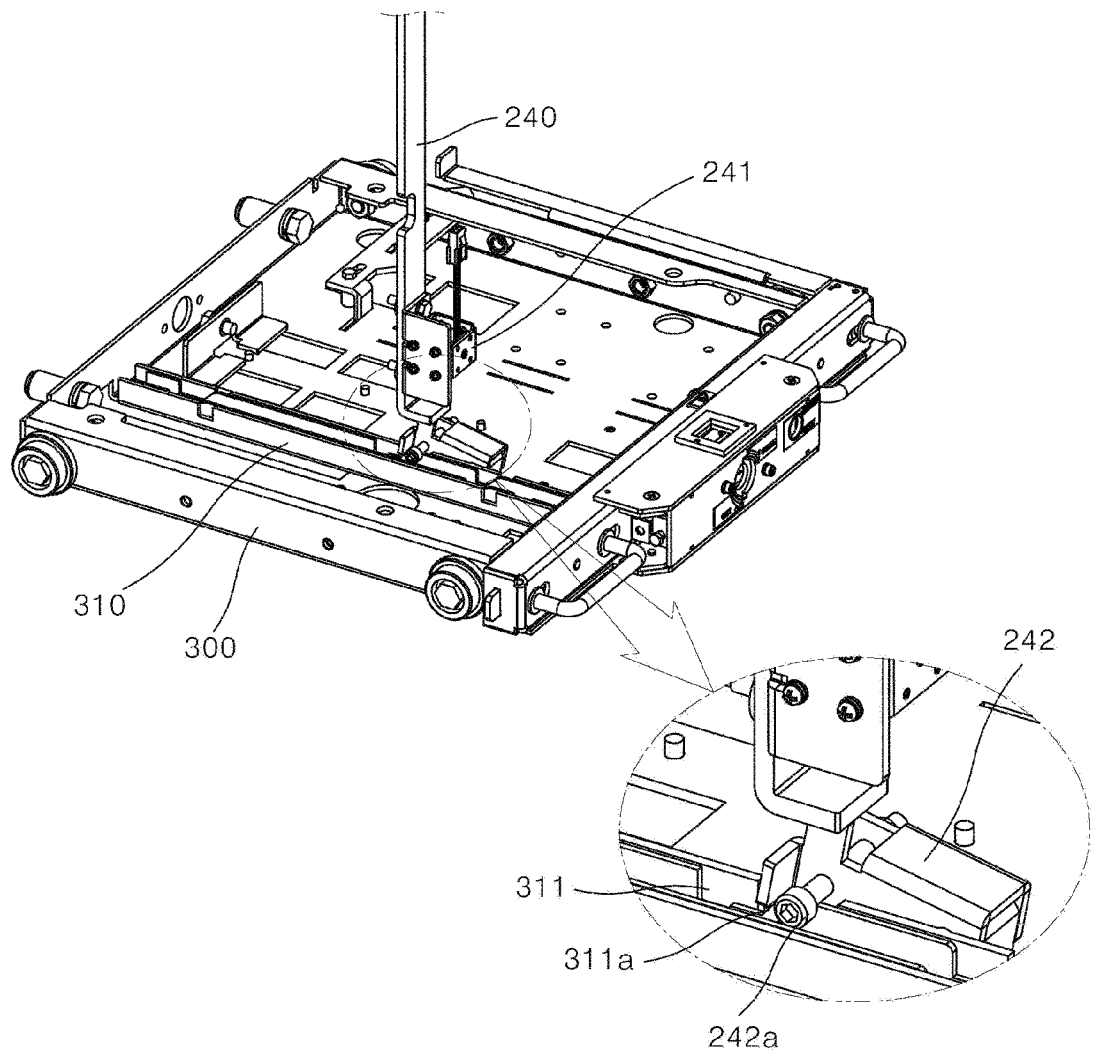
FIG. 9 is a perspective view showing the test position of the main component in the plug interlock apparatus for the vacuum circuit breaker according to an embodiment of the present disclosure.
Figure 10:
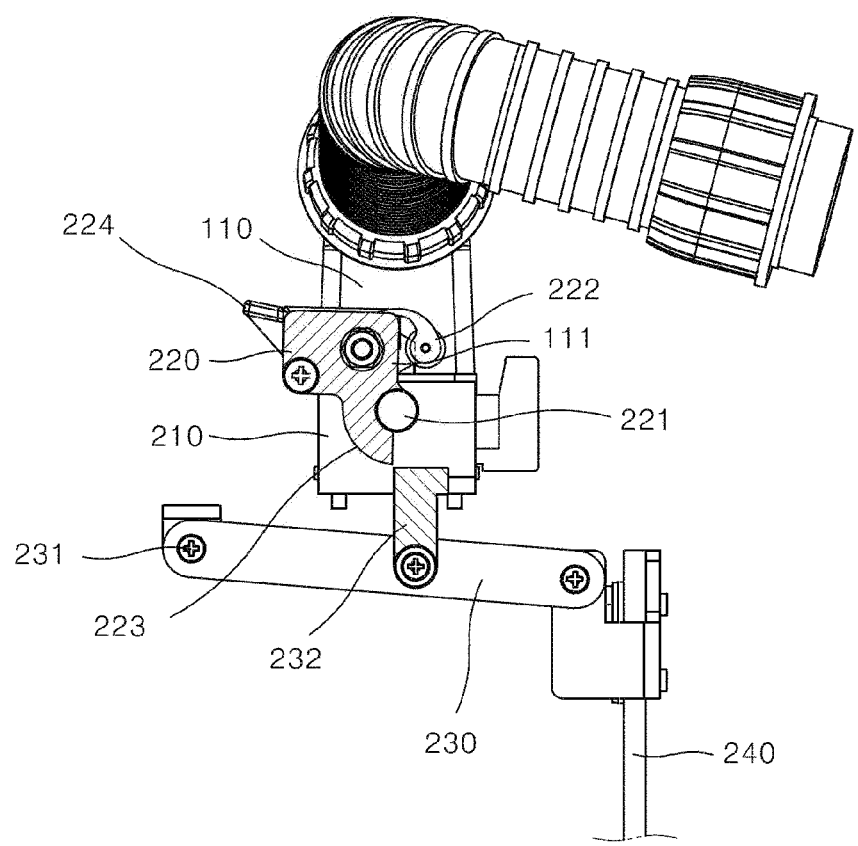
FIG. 10 is a side view showing the test position of the main components in the plug interlock apparatus for the vacuum circuit breaker according to an embodiment of the present disclosure.

Further, FIG. 9 and FIG. 10 are perspective and side views, respectively, showing the test position of the major components in the plug interlock apparatus for the vacuum circuit breaker according to an embodiment of the present disclosure.

Referring to FIG. 1 and FIG. 8 to FIG. 10, the test position of the plug interlock apparatus for a vacuum circuit breaker according to the present disclosure at which the control power plug 110 and the control power connector 210 are coupled to each other, and the movable carriage 300 is in a state such that the circuit breaker body 200 is spaced apart from the terminal 120 is described.

As the control power plug 110 is coupled to the control power connector 210, the plug latch 220 pivots such that the plug fixing member hook 222 hooks the plug fixing member 111 so that the control power plug 110 is not removed from the control power connector 210, as shown in FIG. 10.

Further, as the plug latch 220 pivots, the arc portion 223 is spaced apart from the pivot link stopper 232, so that the pivot movement of the connector pivot link 230 is possible.

Accordingly, as shown in FIG. 9, the slide link 240 rises, and thus the locking pin 242a is removed from the rail groove 311.

More specifically, the slide link 240 is configured such that as one end of the connector pivot link 230 pivots, the link 240 rises and at the same time, moves in a frontward direction opposite to a direction in which the movable carriage 300 moves toward the terminal 120.

Accordingly, the locking pin 242a is removed from the rail groove 311 while moving along an inclined portion 311a of the rail groove 311.

Further, the slide link 240 may further include a locking magnet 241 electrically operating to prevent the slide link 240 from rising.

More specifically, the locking magnet 241 is provided with a pin (not shown) therein which is inserted into a hole (not shown) formed in the circuit breaker body 200 to prevent the slide link 240 from rising.

Accordingly, the firm coupling between the control power plug 110 and the control power connector 210 may be more reliably maintained.

Figure 11:
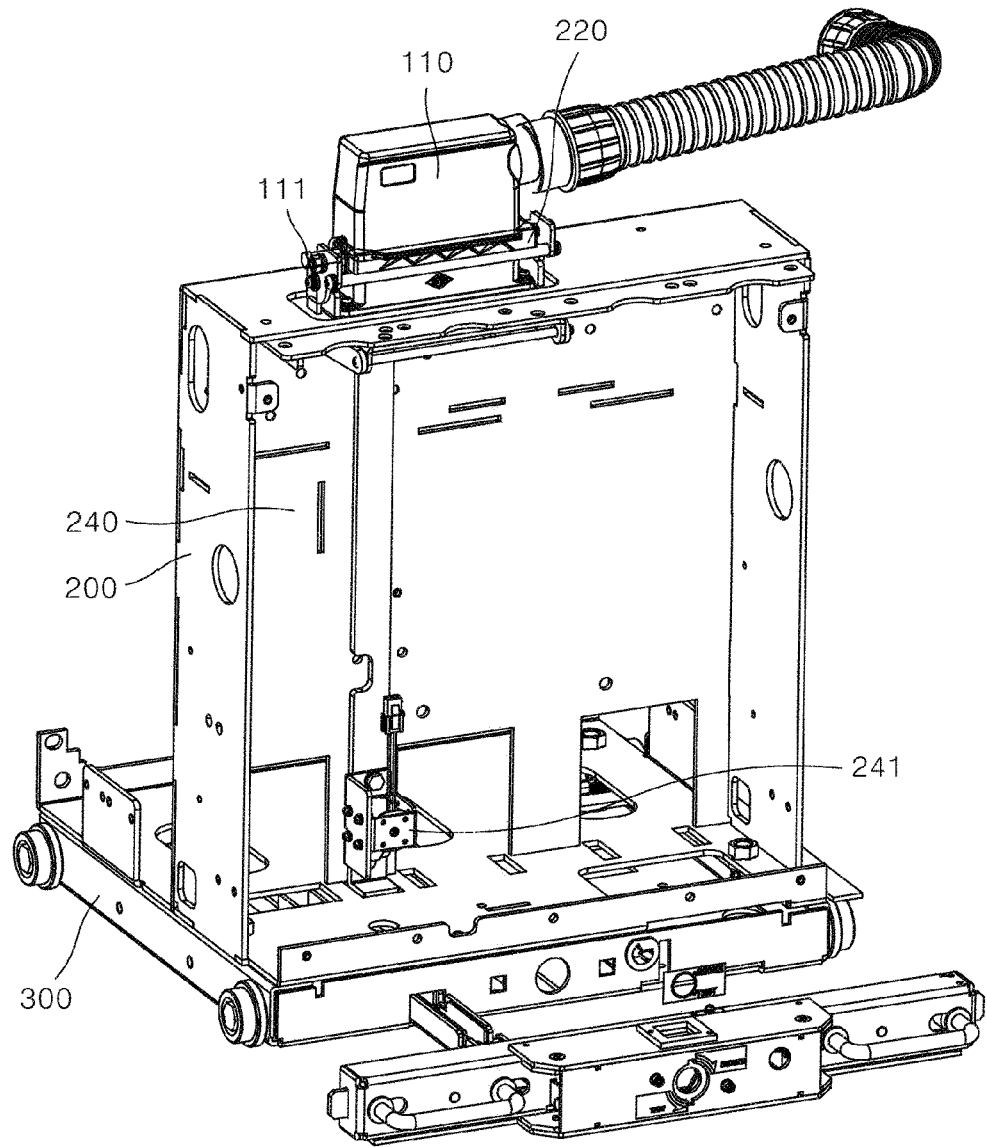
FIG. 11 is a perspective view illustrating an operation position of the plug interlock apparatus for the vacuum circuit breaker according to an embodiment of the present disclosure.

In one example, FIG. 11 is a perspective view illustrating an operation position of a plug interlock apparatus for a vacuum circuit breaker according to an embodiment of the present disclosure.

Figure 12:
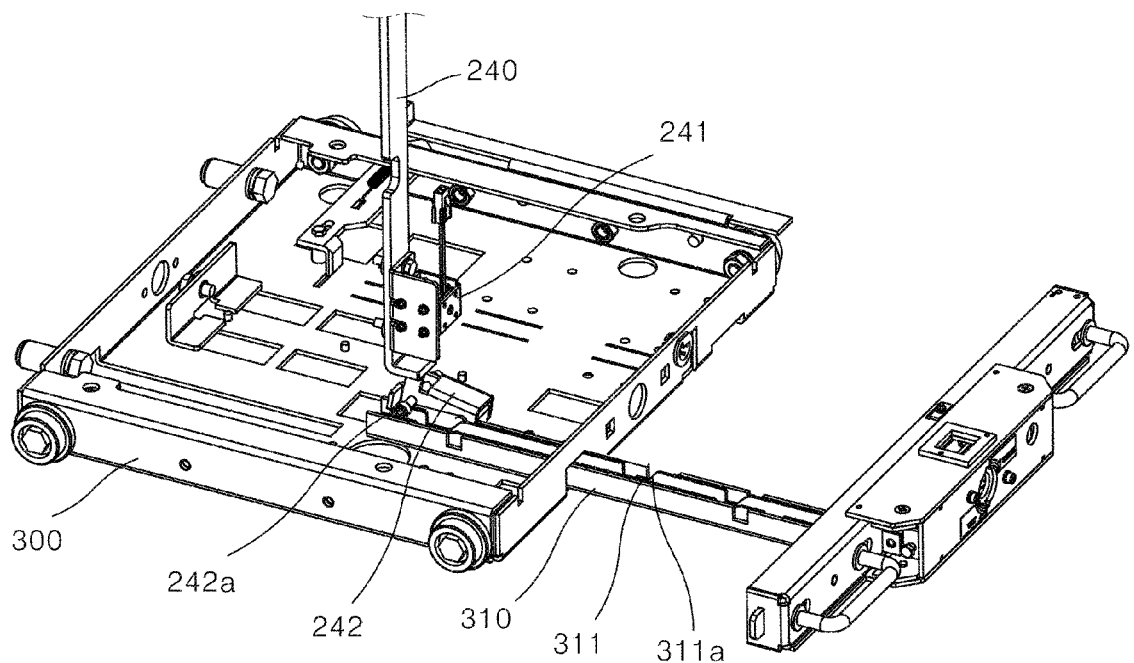
FIG. 12 is a perspective view showing the operation position of the main component in the plug interlock apparatus for the vacuum circuit breaker according to an embodiment of the present disclosure.
Figure 13:
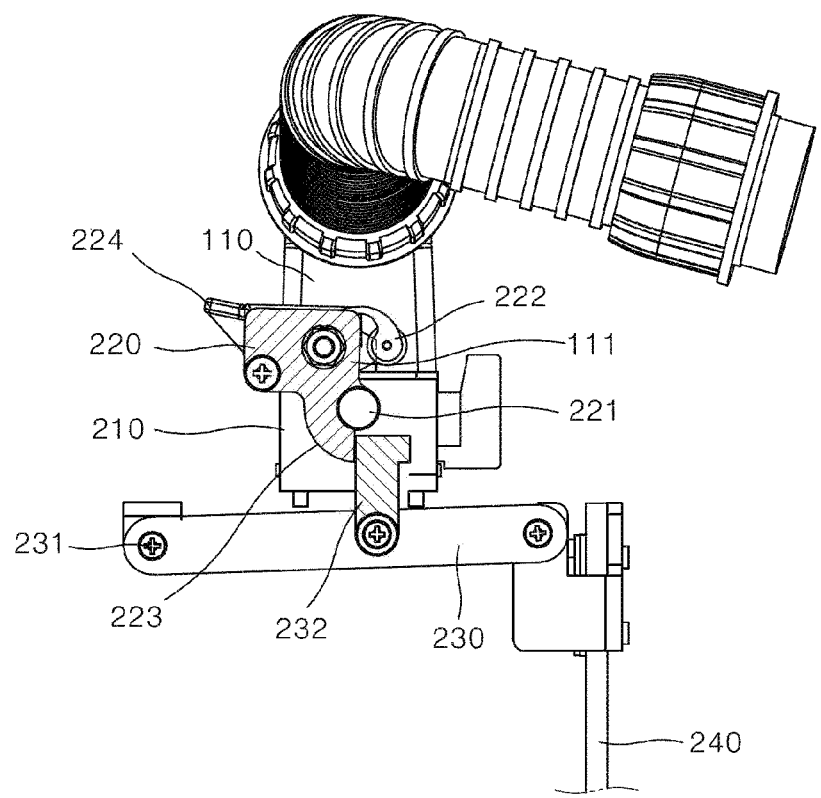
FIG. 13 is a side view showing the operation position of the main component in the plug interlock apparatus for the vacuum circuit breaker according to an embodiment of the present disclosure.

Further, FIG. 12 and FIG. 13 are a perspective view and a side view showing the operation position of the main components in the plug interlock apparatus for a vacuum circuit breaker according to an embodiment of the present disclosure, respectively.

Referring to FIG. 1 and FIG. 11 to FIG. 13, the operation position of the plug interlock apparatus for a vacuum circuit breaker according to the present disclosure at which the control power plug 110 and the control power connector 210 are coupled to each other, and the movable carriage 300 moves such that the circuit breaker body 200 is coupled to the terminal 120.

As the control power plug 110 is coupled to the control power connector 210 in the test position as described above, a state in which the pivot link stopper 232 has ascended toward the control power plug 110 is maintained while the plug fixing member hook 222 hooks the plug fixing member 111, as shown in FIG. 13, thereby preventing the control power plug 110 from being removed from the control power connector 210.

More specifically, the pivot movement of the plug latch 220 in the direction in which the plug fixing member hook 222 is opened such that the plug fixing member 111 can move upward is disabled by the pivot link stopper 232.

Accordingly, when the circuit breaker body 200 moves from the test position to the operation position or during the operation thereof, the firm coupling between the control power plug 110 and the control power connector 210 may be maintained, thereby preventing a safety accident in advance.

Further, at the operation position, the slide link 240 rises from the test position as described above. Thus, the movable carriage 300 moves along the rail 310 while a state in which the locking pin 242a is removed from the rail groove 311 is maintained. Thus, the circuit breaker body 200 may be coupled to the terminal 120.

The configuration as described above may minimize the damage and operation failure of each part due to external force or assembly tolerance of each part, such that the reliability of the plug interlock apparatus for a vacuum circuit breaker may be improved.

The present disclosure has been described above with reference to the illustrated drawings. However, the present disclosure is not limited to the embodiments and drawings disclosed in the present specification. It is obvious that various modifications may be made by those skilled in the art within the scope of the technical idea of the present disclosure.

In addition, although effects according to the configurations of the present disclosure are not explicitly described while describing the embodiments of the present disclosure, it is natural that the predictable effects from the configurations should also be appreciated.

What is claimed is:

1. A plug interlock apparatus comprising:
    a switchboard including a control power plug having a plug fixing member and a plurality of terminals;
    a circuit breaker body including:
        a control power connector from and to which the control power plug is detached and attached;
        a plug latch formed on each side of the control power connector so as to fix the plug fixing member;
        a connector pivot link configured to pivot in conjunction with the plug latch; and
        a slide link having a first end coupled to the connector pivot link,
        wherein the circuit breaker body is coupled to the terminal and receive voltage and current therefrom; and
    a movable carriage configured to move along a rail installed on a bottom face of the switchboard so as to reciprocate the circuit breaker body thereon,
    wherein a locking latch is installed at a second end of the slide link, wherein the locking latch is inserted into or removed from a rail groove defined in the rail,
    wherein when the plug interlock apparatus is in a neutral position, the plug latch is positioned such that when the plug fixing member moves downward, a hook of the plug fixing member does not interfere with the plug fixing member, and the slide link is fixed,
    wherein when the plug interlock apparatus is in a test position, the plug latch pivots such that the hook of the plug fixing member hooks the plug fixing member, and as the slide link rises, the movable carriage moves in a frontward direction opposite to a direction in which the plug latch moves toward the plurality of terminals, and
    wherein when the plug interlock apparatus is in an operation position, a pivot movement of the plug latch in the direction in which the hook of the plug fixing member is opened such that the plug fixing member can move upward is disabled.

2. The apparatus of claim 1, wherein the slide link moves downward or upward according to the pivot movement of the connector pivot link.

3. The apparatus of claim 1, wherein a connector pivot link stopper is in contact with an arc portion of the plug latch so as to limit the pivot movement of the connector pivot link.

4. The apparatus of claim 3, wherein when the arc portion is spaced apart from the connector pivot link stopper, a pivot movement of the plug latch is allowed.

* * * * *